Patented Dec. 27, 1949

2,492,163

UNITED STATES PATENT OFFICE 2,492,163

REACTION PRODUCTS OF CHRYSOIDINE WITH BASIC DYES

Roy Clifford Locke, Salem, N. J., assignor to E. I. du Pont de Nemours & Company, Wilmington, Del., a corporation of Delaware No Drawing. Application March 14, 1945, Serial No. 582,789

6 Claims. (Cl. 260—208)

This invention relates to novel organic coloring compounds. More particularly, this invention deals with new coloring compounds obtainable by interaction between two or more water-soluble organic dyes which are free of acid substituents, e. g., sulfo or carboxy groups.

It is an object of this invention to produce novel organic coloring compounds. A further object is to provide a method for producing black coloring compositions, approximating in shade those obtained by mixing known dyes, but without the attendant disadvantages resulting from the mechanical mixing of dyes. A still further object of the invention is to provide organic coloring matters which possess basic groups, but are not in the form of a salt thereof with inorganic acids. A still further object is to provide a new class of coloring materials particularly adapted for use as spirit printing inks and for such additional purposes as typewriter ribbon, hectograph carbon coatings and similar duplicating compositions. Other and further objects of this invention will appear as the description proceeds.

The organic coloring materials generally known as basic dyes comprise the classes of polyaryl-methanes, ketonimines, xanthenes, acridines, thiazoles, etc. They are characterized by possessing aromatic amino groups, which when converted into the corresponding hydrochlorides impart water-solubility to the entire molecule. In fact, such basic dyes are generally isolated and handled in the form of salts of strong acids such as hydrochloric, nitric, sulfuric or oxalic. Certain azo dyes and azine dyes, which possess primary amino groups, are likewise isolated and handled in the form of hydrochlorides or similar salts, and therefore likewise fall in the class of basic dyes.

I have now found that if any of the aforementioned basic dyes possessing at least two primary amino groups but no water-solubilizing acidic substituents, is mixed in aqueous solution with a basic dye of a special molecular structure, as defined below, a hitherto unobserved or unreported reaction apparently takes place, precipitating a compound which seems to be a complex addition compound of the ingredients employed. The basic dye which possesses at least two primary amino groups, hereinafter referred to as the precipitant, may be selected, for instance, from the groups of azo dyes, azine dyes, polyaryl-methanes and acridines. The other basic dye which will hereinafter be referred to as the precipitable dye appears to be limited in choice to a molecular structure which includes at least one phenyl ring joined to a double-bonded methane carbon atom; in other words, the precipitable dye is limited to the basic dye subclasses of diaryl-methanes, triaryl-methanes, ketonimines, xanthenes, acridines, thiazoles, and other dye compounds which include in their structure the benzylidene configuration

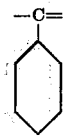

As already mentioned, both precipitant and precipitable dyes must be free of water-solubilizing acid substituents such as sulfo or carboxy.

The exact nature of this reaction or the structure of the resulting compound is not clear to me at this time, but that such reaction takes place is beyond doubt, as proven by the following observations:

1. The resulting product is less soluble in water than the individual components thereof.

2. The precipitated product is more soluble in alcohol than would be expected from a mixture of the initial components.

3. The reaction apparently proceeds according to the stoichiometric laws. Thus, a. If the product is ground to a fine dust and then blown onto a white sheet of paper moistened with alcohol, a colored spot is formed on the sheet. If the reaction was effected between stoichiometric proportions, the color of the spot is uniform throughout and has a sharp outline. But if an excess of one of the components is employed, its shade, which is generally different from the shade of the precipitated product, bleeds into the surrounding areas, producing a colored halo around the intensely colored spot.

b. If Chrysoidine GN is employed as precipitant and Crystal Violet is employed as precipitable dye, the clean cut precipitate as tested by the dusted spot method above described is obtained when the two dyes are employed in equal molecular proportions. But if Basic Brown BR is employed instead of Chrysoidine, two molecular proportions of Crystal Violet are needed to produce a clean cut precipitate, as tested by the dust spot. It will be noted that Basic Brown BR possesses two azo groups and four primary amino groups, as compared with the single azo bridge and two primary amino groups of Chrysoidine.

4. If the aforementioned precipitate is incorporated in alcohol, castor oil, beeswax, or other similar fatty or waxy composition for the purpose of producing a spirit printing ink, a typewriter ribbon saturating ink or a coating for carbon paper, the "working properties" of the ink are not so adversely affected as when a mechanical mixture of the same initial dyes is incorporated in the same fatty or waxy material in the same proportions.

5. When the aqueous solutions of the component dyes are mixed, the pH of the aqueous phase drops after precipitation has occurred, indicating an increase in free acid. This is to be explained by the presumption that the component dyes have reacted, splitting off at least part of the inorganic acids which originally formed salts with the respective initial dyes.

My new compounds are of tremendous practical importance inasmuch as they open up new and vast fields of organic colors for various practical purposes such as the manufacture of spirit printing inks, hectograph inks, typewriter ribbon, etc. As will be clear from the aforegoing discussion, my invention enables the production of a resultant shade, for instance black, from two highly colored dyes, for instance a violet and an orange, without introducing the customary disadvantages which result from mixing dyes mechanically, such as unequal exhausting qualities, separation, bleeding, adverse effect on the working qualities, etc.

Incidentally, my new compounds are recoverable in a state of purity much higher than the initial dyes from which they are formed, and are in particular substantially free of inorganic salts. This factor by itself is of tremendous significance, inasmuch as basic dyes, by virtue of their high water-solubility, are generally contaminated with considerable quantities of electrolytes. The latter have an adverse effect on the working properties of the color when incorporated into organic vehicles, and often cause the mass to gel so badly that it can no longer be worked.

Without limiting my invention to any particular procedure, the following examples will serve to illustrate my preferred mode of operation. Parts mentioned are by weight.

*Example 1*

Solution A.—40.0 parts of Chrysoidine GN, 83% pure (approximately 0.134 mols., C. I. 20), 900.0 parts of water at 75° F.

Solution B.—48.3 parts of Crystal Violet, 93% pure (approximately 0.110 mols., C. I. 681), 15.0 parts of Victoria Blue B Conc., 82.2% pure (approximately 0.024 mols., C. I. 729), 600.0 parts of water at 75° F.

In each case, add the dye to the water with good agitation. Heat to 180° F. to completely dissolve the dye.

Add solution A to solution B at 180° F. Continue stirring at 180° F. for 15 minutes. Shut off heat and allow to stand until cool or until the color settles to the bottom of the precipitation vessel.

At 180° F., the precipitate is colloidal. It has a bronze cast which is shown by spotting the slurry on filter paper. The center of the spot consists of a lustrous bronzy black precipitate which is surrounded by a clear rim of liquid. If one type of dye is present in excess it bleeds into this outer rim.

To recover the settled precipitate, draw off the aqueous liquor. Slowly heat the segregated color mass to 140° F. to form a melt, as is customary in isolating many basic dyes on a commercial scale. Run the melt into glazed porcelain drying pans. Dry in an oven at 150° F., turning after 24 hour intervals to speed drying. Cool and grind the product to about 60 mesh fineness. A blue black precipitate, having excellent solubility in spirit solvents, is obtained.

As an alternative method of recovery, the above colloidal system may be cooled with agitation and then filtered in the usual manner. The preferred method of isolation selected will depend on the type of equipment available.

The isolated product shows less solubility in water and a greater rate and degree of solubility in alcohol than the mechanically mixed constituents. When the powder is blown on a sheet of filter paper moistened with alcohol a uniform blue black stain is seen, contrasted with the multi-colored spots of a mechanical mixture.

When incorporated in the usual carnauba wax-mineral oil combinations used for coating hectograph carbon paper, this product produces an ink of lower viscosity and superior heat stability to mechanical mixtures of the same dyes. The carbon produces a master copy having many times the copying power of the mechanically mixed, spirit-soluble dyes of the prior art. Since this product acts as a single dye, the copies are of uniform shade throughout. In this respect it is much superior to mechanical mixtures, the components of which exhaust at different rates causing a shift in shade. In addition, there is no bleed of the dye into the carrier sheet of the hectograph carbon paper as in the blacks of the prior art.

*Example 2*

The process of Example 1 is followed with the following changes:

Solution A.—34.5 parts of Chrysoidine GN, 83% pure (0.115 mols., C. I. 20), 490.0 parts water.

Solution B.—22.5 parts of Acridine Orange, 57.2% pure (0.043 mols., C. I. 788), 25.4 parts of Crystal Violet, 93% pure (0.060 mols., C. I. 681), 8.5 parts of Victoria Blue, 82.2% pure (0.014 mols., C. I. 729), 543.0 parts water.

A spirit soluble black dye with an excellent jet shade is produced. It shows the same excellent properties in hectograph composition as the product of Example 1.

In a similar manner, other basic dyestuffs of the structure as above defined may be combined with water-soluble basic dyes having primary amino groups to produce a precipitated complex coloring matter, as illustrated by the following table:

| Precipitant | Colour Index No. | Precipitatable Dye | Colour Index No. | Shade of product in alcohol |
|---|---|---|---|---|
| Chrysoidine GN | 20 | Acridine Orange | 788 | Red-orange. |
| Do | 20 | Thioflavine TCN | 815 | Orange. |
| Do | 20 | Auramine | 655 | Do. |
| Do | 20 | Crystal Violet | 681 | Magenta. |
| Do | 20 | Rhodamine 5G | 752 | Red-orange. |
| Do | 20 | Brilliant Green | 662 | Yellow-Green. |
| Do | 20 | Fuchsine | 677 | Scarlet. |
| Do | 20 | Phosphine | 794 | Orange. |
| Basic Brown BR | 332 | Rhoduline Blue | 658 | Green-black. |
| Do | 332 | Victoria Blue | 729 | Dull violet. |
| Fuchsine | 677 | ____do____ | 729 | Bright violet. |
| Do | 677 | Rhoduline Blue | 658 | Red-blue. |
| Safranine | 841 | Victoria Blue | 729 | Violet. |
| Phosphine | 794 | ____do____ | 729 | Green. |

The colored complex compounds obtainable from Fuchsine, Safranine and Phosphine as precipitants and typified by the last 4 items in the above table are discussed more fully and claimed in my copending application Serial No. 117,929, filed September 26, 1949.

The following additional examples will serve to illustrate the mode of incorporating my novel coloring matters in various waxes or organic solvents to produce various coating compositions for practical purposes:

*Example 3*

11.0 parts of carnauba wax,
31.0 parts of mineral oil,
58.0 parts of the product of Example 2.

Mix the above components and heat to melt the wax. Grind by passing 6 times over a three-roll ink-mill. Remelt and coat on a carrier sheet.

The black hectograph paper thus obtained is more stable to storage and gives stronger copies of a uniform neutral black shade than the products of the prior art made by mechanically mixing the same component dyes. The sparing solubility of the reaction product of Example 2 in water makes the duplicated copies more resistant to water bleed than conventional hectograph copies. The dye composition and the carbon paper show less tendency to stain the skin than those compounded with Crystal Violet by itself.

*Example 4*

25.0 parts of methyl acetate,
45.0 parts of ethyl alcohol,
15.0 parts of methyl Cellosolve (Riegel, Ind. Chem., p. 467).
12.0 parts of acetone,
3.0 parts of the product of Example 2.

Dissolve the dye in the mixed solvents at 75° F. The resulting solution may be used as a spirit printing ink or as a surface stain on wood, leather, paper, textiles, etc., to give a color of greater resistance to water bleeding than is given by the parent dye constituents.

It will be understood that the above examples are merely illustrative and that my invention is susceptible of many variations as to constituents and details of procedure, as will be readily apparent to those skilled in the art. The only limiting factors that I have found with respect to my invention thus far are as follows:

1. The dyes used must be water-soluble.
2. The basic dyes must be devoid of water-solubilizing acid substituents, such as sulfo or carboxy groups.
3. The precipitant must contain a plurality of primary amino groups and no water-solubilizing acid groups, such as sulfo or carboxy.
4. The constituents should preferably be employed in stoichiometric proportions.

For economy, the use of saturated dye solutions is recommended, but more dilute solutions can be used, if desired.

Although stoichiometric proportions of the reacted dyes are preferred, a slight excess of either component may be employed if desired, the excess then being washed out with water from the precipitate.

As illustrated by the above examples, several basic colors may be precipitated simultaneously by the same precipitant, and vice versa, producing a mixture of colors in a single step.

As already indicated, the principal immediate use for my novel compounds is in the production of various duplicating compositions such as hectograph inks and spirit printing inks. In these fields my novel compounds have the following advantages over mere mechanical mixtures of the component dyes:

1. Improved solubility in organic spirit solvents such as alcohols, ethers, esters, etc.
2. Less water bleed.
3. Simplified purification and blending operations compared to present practice.
4. More jet black shades are possible in spirit hectograph duplication formulas while still maintaining good working properties in the wax-oil, carbon-paper compositions.
5. Increased copy power in hectograph work.
6. Utilizing cheaper dyestuffs to replace part of the expensive polyaryl-methane colors normally used.
7. Improved working properties such as viscosity, heat-stability and lack of bleed in wax-oil media.
8. Increased selection of dyes is available for hectograph work, since this method will free of inorganic salts many colors not considered usable heretofore. As previously mentioned the presence of inorganic salts interferes with the working properties of a dye in hectograph coatings and excludes many dyes from consideration in this type of work.
9. Greater uniformity of shade from copy to copy throughout duplication than obtainable with mechanical mixtures.

Other uses include the production of typewriter ribbons, which may be made by incorporating the color in the usual oils used for that purpose, and uses in hectograph stamping inks and writing inks.

Spirit inks and stains may be made from my novel coloring matters by using any of the usual solvents. Binders may be used if necessary.

I am aware that mixtures of Chrysoidine with various basic dyes have been suggested in the art for use in duplicating inks, but the discussion there concerned strictly mechanical mixtures produced by mixing the dry colors in finely divided condition with a suitable vehicle or medium. No attempt was made to mix the component colors in the form of aqueous solutions, and no observation was made or reported that under these conditions a reaction takes place producing a precipitate having different physical properties and being much superior in quality for the purpose aforementioned than the mechanical mixture of the components.

In the claims below, where I characterize certain products as "water-insoluble," I mean that the products are too insoluble to be usable as dyestuffs from an aqueous bath; in other words, I am referring to a water-solubility of 0.2% by weight or less.

I claim as my invention:

1. A black organic coloring composition adapted for use as coloring matter in hectograph carbon paper, comprising the water-insoluble reaction products of Chrysoidine with at least two water-soluble basic dyes selected from the group consisting of the polyaryl-methanes, ketonimines, xanthenes, acridines and thiazoles, said basic dyes being devoid of sulfo and carboxy groups, and one of them being Crystal Violet, the sum of all the colors in the composition not counting Chrysoidine being equal to one mole for each mole of Chrysoidine present, said other colors being chemically combined with said Chrysoidine, and the entire composition being free of inorganic salts and being substantially free of unreacted residues of any of the component colors.

2. The process of producing an alcohol-soluble, water-insoluble black organic coloring matter in solid form and substantially free from inorganic salts, which comprises mixing an aqueous solution of Chrysoidine with an aqueous solution of Crystal Violet and at least one more water-soluble basic dye selected from the group consisting of the polyaryl-methanes, ketonimines, xanthenes, acridines and thiazoles and being devoid of sulfo and carboxy groups, said solutions being chosen in such quantities as to provide a total of one mole of colors other than Chrysoidine for each mole of Chrysoidine, and to provide a total quantity of the resulting reaction product in excess of that needed to saturate the aqueous mixture, whereby to precipitate the bulk of said reaction product; and recovering the precipitated color free of inorganic salts.

3. The process of producing an alcohol-soluble, water-insoluble organic dye in solid form and substantially free from inorganic salts, which comprises mixing an aqueous solution of Chrysoidine with an aqueous solution of Chrysal Violet and Victoria Blue, the solutions being chosen in such quantities as to provide a total of one mole of the last-mentioned two colors for each mole of said first-mentioned color, and to provide a total quantity of the resulting reaction product in excess of that needed to saturate the aqueous mixture, whereby to precipitate the bulk of said reaction product; and separating said precipitate from the mother liquor.

4. The process of producing an alcohol-soluble, water-insoluble organic dye in solid form and substantially free from inorganic salts, which comprises mixing an aqueous solution of Chrysoidine with an aqueous solution of Acridine Orange, Crystal Violet and Victoria Blue, the solutions being chosen in such quantities as to provide a total of one mole of the last-mentioned three colors for each mole of said first-mentioned color, and to provide a total quantity of the resulting reaction product in excess of that needed to saturate the aqueous mixture, whereby to precipitate the bulk of said reaction product; and separating said precipitate from the mother liquor.

5. A black organic coloring composition comprising the water-insoluble reaction product of Chrysoidine with a mixture of Crystal Violet and Victoria Blue, the sum of the molecular proportions of the latter two being substantially equal to the molecular proportion of said Chrysoidine.

6. A black coloring composition comprising the water-insoluble reaction product of Chrysoidine with a mixture of Acridine Orange, Crystal Violet and Victoria Blue, the sum of the molecular proportions of the latter three dyestuffs being substantially equal to the molecular proportion of said Chrysoidine.

ROY CLIFFORD LOCKE.

REFERENCES CITED

The following references are of record in the file of this patent:

UNITED STATES PATENTS

| Number | Name | Date |
|---|---|---|
| 661,800 | Gutzkow et al. | Nov. 13, 1900 |
| 1,209,423 | Fisher | Dec. 19, 1916 |
| 1,614,281 | Churchman | Jan. 11, 1927 |
| 2,104,357 | Straub et al. | Jan. 4, 1938 |
| 2,138,836 | Brower | Dec. 6, 1938 |
| 2,155,862 | Hughes | Apr. 25, 1939 |
| 2,424,954 | Newman | July 29, 1947 |

FOREIGN PATENTS

| Number | Country | Date |
|---|---|---|
| 8,536 | Great Britain | A. D. 1894 |

OTHER REFERENCES

Color Index—1st, Edition, January 1924, page 173.